(12) United States Patent
Fujisaki et al.

(10) Patent No.: US 9,793,529 B2
(45) Date of Patent: *Oct. 17, 2017

(54) LAYERED-DOUBLE-HYDROXIDE-ORIENTED FILM AND METHOD FOR PRODUCING SAME

(71) Applicant: NGK Insulators, Ltd., Nagoya-Shi (JP)

(72) Inventors: Megumi Fujisaki, Nagoya (JP); Naomi Saito, Nagoya (JP); Naohito Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,620

(22) Filed: Jul. 31, 2015

(65) Prior Publication Data

US 2015/0340680 A1 Nov. 26, 2015

Related U.S. Application Data (63) Continuation of application No. PCT/JP2014/083218, filed on Dec. 16, 2014.

(30) Foreign Application Priority Data

Dec. 27, 2013 (JP) .................................. 2013-271993
Jun. 27, 2014 (JP) .................................. 2014-132598

(51) Int. Cl.
*H01M 10/0562* (2010.01)
*H01M 2/16* (2006.01)
(Continued)

(52) U.S. Cl.
CPC .......... *H01M 2/1686* (2013.01); *C01F 7/162* (2013.01); *H01M 2/1646* (2013.01);
(Continued)

(58) Field of Classification Search
CPC ............ H01M 2/1686; H01M 2/1646; H01M 8/1016; H01M 10/0562; H01M 12/06;
(Continued)

(56) References Cited

U.S. PATENT DOCUMENTS

2010/0212712 A1 8/2010 Tran
2012/0077109 A1 3/2012 Hong et al.
(Continued)

FOREIGN PATENT DOCUMENTS

CN 1333113 C 8/2007
JP 2005-310612 A1 11/2005
(Continued)

OTHER PUBLICATIONS

Khenifi, A. et al. "Glyphosate and glufosinate detection at electrogenerated NiAl-LDH thin films", Analytica Chimica Acta, vol. 654, pp. 97-102, Sep. 20, 2009.*
(Continued)

*Primary Examiner* — Sarah A Slifka
*Assistant Examiner* — Lilia V Nedialkova
(74) *Attorney, Agent, or Firm* — Burr & Brown, PLLC (57) ABSTRACT

Provided is a layered double hydroxide oriented membrane in which layered double hydroxide plate-like particles are highly oriented in the approximately perpendicular direction and which is also suitable for densification. The layered double hydroxide oriented membrane of the present invention is composed of a layered double hydroxide represented by the general formula: $M^{2+}_{1-x}M^{3+}_{x}(OH)_2 A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, x is 0.1 to 0.4, and m is 0 or greater, wherein when a surface of the oriented membrane is measured by X-ray
(Continued)

diffractometry, a peak of a (003) plane is not substantially detected or is detected to be smaller than a peak of a (012) plane.

15 Claims, 8 Drawing Sheets

(51) Int. Cl.
*H01M 8/10* (2016.01)
*H01M 8/1016* (2016.01)
*C01F 7/16* (2006.01)
*H01M 12/06* (2006.01)

(52) U.S. Cl.
CPC ..... *H01M 8/1016* (2013.01); *H01M 10/0562* (2013.01); *C01P 2002/22* (2013.01); *C01P 2002/74* (2013.01); *H01M 12/06* (2013.01); *H01M 2300/0068* (2013.01)

(58) Field of Classification Search
CPC ............ H01M 2300/0068; C01F 7/162; C01P 2002/22; C01P 2002/74
See application file for complete search history.

(56) References Cited

U.S. PATENT DOCUMENTS

| 2014/0227616 A1* | 8/2014 | Yamada | H01M 12/08 429/406 |
| 2014/0315099 A1 | 10/2014 | Yamada et al. | |

FOREIGN PATENT DOCUMENTS

| JP | WO 2013073292 A1 * | 5/2013 | ............ H01M 12/08 |
| JP | 2013-191523 A1 | 9/2013 | |
| WO | 2006/050648 A1 | 5/2006 | |
| WO | 2010/109670 A1 | 9/2010 | |
| WO | 2013/118561 A1 | 8/2013 | |

OTHER PUBLICATIONS

Lei, X., et al. "Synthesis of Oriented Layered Double Hydroxide Thin Films on Sulfonated Polystyrene Substrates", Chemistry Letters, vol. 34, pp. 1610-1611, published Oct. 29, 2005.*
English translation prepared by the International Bureau of the Written Opinion of the International Searching Authority (Application No. PCT/JP2014/083218) dated Oct. 27, 2015.
Hongyun Chen et al., "*In Situ Microstructure Control of Oriented Layered Double Hydroxide Monolayer Films with Curved Hexagonal Crystals as Superhydrophobic Materials,*" Advanced Materials, vol. 18, No. 23, Dec. 4, 2006, pp. 3089-3093.
Shifeng Li et al., "*One-Step Fabrication of Oriented Mg/Al-Layered Double Hydroxide Film on Magnesium Substrate with Urea Hydrolysis and its Corrosion Resistance,*" Composite Interfaces, vol. 19, No. 8, Nov. 1, 2012, pp. 489-498.
Ye Kuang et al., "*Morphologies, Preparations and Applications of Layered Double Hydroxide Micro-/Nanostructures,*" Materials, vol. 3, No. 12, Dec. 9, 2010, pp. 5220-5235.
Extended European Search Report (Application No. 14875447.6) dated Jan. 5, 2016.
Zhi Lu, et al., "*Microstructure-controlled Synthesis of Oriented Layered Double Hydroxide Thin Films: Effect of Varying the Preparation Conditions and a Kinetic and Mechanistic Study of Film Formation,*" Chemical Engineering Science, vol. 62, Issue 21, 2007, pp. 6069-6075.
Jae-Min Oh, et al., "*The Effect of Synthetic Conditions on Tailoring the Size of Hydrotalcite Particles,*" Solid State Ionics, vol. 151, Issues 1-4, Nov. 2002, pp. 285-291.
International Search Report and Written Opinion (Application No. PCT/JP2014/083218) dated Mar. 10, 2014 (with English translation).
Zhiyong Sun, et al., "*A Structured Catalyst Based on Cobalt Phthalocyanine/calcined Mg—Al Hydrotalcite Film for the Oxidation of Mercaptan†,*" Green Chemistry, 2012, vol. 14, pp. 1909-1916.
Office Action, U.S. Appl. No. 15/007,474, dated Jul. 13, 2016 (12 pages).
Liu et al, "Structured Chiral Adsorbent Formed by Cyclodextrin Modified Layered Solid Film," *Chemical Engineering Science*, vol. 64, dated Feb. 12, 2009 (9 pages).
Guo et al, "Layered Double Hydroxide Films: Synthesis, Properties and Applications," *Chem. Commun.*, vol. 46, dated Jun. 15, 2010 (14 pages).
U.S. Office Action from related U.S. Appl. No. 15/007,474, dated Sep. 8, 2016 (23 pages).
U.S. Office Action, U.S. Appl. No. 15/007,474, dated Dec. 30, 2016 (13 pages).
European Office Action, European Application No. 14873542.6, dated Jan. 3, 2017 (7 pages).
Lü, et al., "In Situ Growth of Layered Double Hyrdoxide Films on Anodic Aluminum Oxide/Aluminum and its Catalytic Feature in Aldol Condensation of Acetone," *Chemical Engineering Science*, vol. 63, dated 2008, pp. 4055-4062 (8 pages).
Tadanaga, et al., "Effect of Mg/Al Ratio on Hydroxide Ion Conductivity for Mg—Al Layered Double Hydroxide and Application to Direct Ethanol Fuel Cells," *Journal of Electrochemical Society*, vol. 159 (4), dated 2012, pp. B368-B370 (3 pages).
European Office Action, European Application No. 14875447.6, dated Dec. 23, 2016 (5 pages).
F. Javier Echave, et al., "Highly Porous Hydrotalcite-Like Film Growth on Anodised Aluminium Monoliths," Studies in Surface Science and Catalysis, vol. 175, 2010, pp. 639-642, Available online Jul. 8, 2010.
Liesl K. Massey, Permeability Properties of Plastics and Elastomers (Second Edition) A Guide to Packaging and Barrier Materials, A volume in Plastics Design Library 2003, Published by Elsevier Inc.
U.S. Office Action (U.S. Appl. No. 15/007,474) dated May 17, 2017.

* cited by examiner

Sample 18

FIG. 6

Sample 9

LAYERED-DOUBLE-HYDROXIDE-ORIENTED FILM AND METHOD FOR PRODUCING SAME

CROSS-REFERENCE TO RELATED APPLICATIONS

This application is a continuation application of PCT/JP2014/083218 filed Dec. 16, 2014, which claims priority to Japanese Patent Application No. 2013-271993 filed Dec. 27, 2013 and Japanese Patent Application No. 2014-132598 filed Jun. 27, 2014, the entire contents all of which are incorporated herein by reference.

BACKGROUND OF THE INVENTION

1. Field of the Invention

The present invention relates to a layered double hydroxide oriented membrane and a method for producing the same.

2. Description of the Related Art

Layered double hydroxides (hereinafter also referred to as LDHs) represented by hydrotalcite are a group of substances having exchangeable anions between hydroxide layers and are used as, for example, catalysts and adsorbents, as well as dispersing agents in polymers for improving heat resistance, by taking advantage of their characteristics. In particular, LDHs have been attracting attention in recent years as materials that conduct hydroxide ions, and addition to the electrolyte of an alkaline fuel cell and the catalyst layer of a zinc-air battery has also been investigated.

In light of conventional areas of application such as catalysts, a large specific surface area is required, and it is therefore sufficient to synthesize and use LDHs in a powder form. On the other hand, in light of application to an electrolyte that takes advantage of hydroxide ion conductivity in alkaline fuel cells or the like, highly dense LDH membranes are desired for preventing mixing of fuel gas and obtaining a sufficient electromotive force.

Patent Documents 1 and 2 and Non-Patent Document 1 disclose oriented LDH membranes, and the oriented LDH membranes are prepared by horizontally suspending a surface-sulfonated polymer substrate in a solution containing urea and metal salts to cause LDHs to nucleate and grow in an oriented manner. An intense peak of the (003) plane is observed in all X-ray diffraction results of the oriented LDH thin membranes obtained in these documents.

CITATION LIST

Patent Documents

Patent Document 1: Chinese Granted Patent Publication No. CNC1333113
Patent Document 2: WO2006/050648

Non-Patent Document

Non-Patent Document 1: Zhi Lu, Chemical Engineering Science 62, pp. 6069-6075 (2007), "Microstructure-controlled synthesis of oriented layered double hydroxide thin films: Effect of varying the preparation conditions and a kinetic and mechanistic study of film formation"

SUMMARY OF THE INVENTION

The inventors have, in advance, succeeded in producing a dense bulk body of an LDH (hereinafter referred to as an LDH dense body). Moreover, the inventors have found, through the evaluation of hydroxide ion conductivity, that the LDH dense body exerts high conductivity by allowing ionic conduction in the layer direction of LDH particles. However, in light of application of an LDH as a solid electrolyte separator to a zinc-air battery, the LDH dense body is problematic by being highly resistant. Accordingly, for practical use of an LDH, reduction of resistance by formation of a thin membrane is desirable. In this regard, the oriented LDH membranes disclosed in Patent Documents 1 and 2 and Non-Patent Document 1 are insufficient in terms of orientation and denseness. Thus, an LDH membrane in which LDH plate-like particles are more highly oriented and which is also suitable for densification is required.

The inventors have currently found that performing a hydrothermal treatment using a urea-containing aqueous raw material solution that contains magnesium ions and aluminum ions in a specific total concentration yields an LDH membrane in which LDH plate-like particles are highly oriented in a direction approximately perpendicular to a substrate. Furthermore, the inventors have also found that this technique in which the hydrothermal treatment is used is also suitable for densifying the LDH membrane.

Therefore, an object of the present invention is to provide an LDH oriented membrane in which LDH plate-like particles are highly oriented in the approximately perpendicular direction and which is also suitable for densification.

According to an aspect of the present invention, there is provided a layered double hydroxide oriented membrane composed of a layered double hydroxide represented by the following general formula:

$$M^{2+}_{1-x}M^{3+}_{x}(OH)_2 A^{n-}_{x/n} \cdot mH_2O$$

wherein $M^{2+}$ is a divalent cation, $M^{3+}$ is a trivalent cation, $A^{n-}$ is an anion having a valency of n, n is an integer of 1 or greater, x is 0.1 to 0.4, and m is 0 or greater,
wherein when a surface of the oriented membrane is measured by X-ray diffractometry, a peak of a (003) plane is not substantially detected or is detected to be smaller than a peak of a (012) plane.

According to another aspect of the present invention, there is provided a method for producing a layered double hydroxide oriented membrane, comprising the steps of:
providing a polymer substrate of which a surface is anionized;
immersing the polymer substrate in an aqueous raw material solution comprising magnesium ions ($Mg^{2+}$) and aluminum ions ($Al^{3+}$) in a total concentration of 0.20 to 0.40 mol/L and comprising urea; and
subjecting the polymer substrate to a hydrothermal treatment in the aqueous raw material solution to form the layered double hydroxide oriented membrane on the polymer substrate.

According to another aspect of the present invention, there is provided a battery comprising the layered double hydroxide oriented membrane of the above aspect as a separator.

DETAILED DESCRIPTION OF THE INVENTION

Layered Double Hydroxide Oriented Membrane

Figure 1:
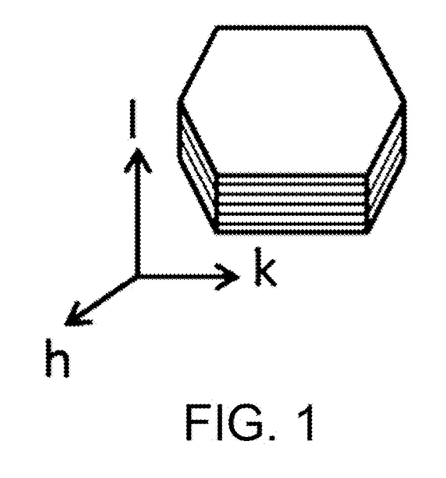
FIG. 1 is a schematic diagram showing a layered double hydroxide (LDH) plate-like particle.

The layered double hydroxide oriented membrane (LDH oriented membrane) of the present invention is composed of a layered double hydroxide (LDH) represented by the general formula: $M^{2+}_{1-x}M^{3+}_x(OH)_2A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, x is 0.1 to 0.4, and m is 0 or greater. It is known that an LDH crystal is in the form of a plate-like particle having a layer structure as shown in FIG. 1. In the membrane of the present invention, LDH plate-like particles are highly oriented, and this high level of orientation can be verified by the peak of the (003) plane being not substantially detected or being detected to be smaller than the peak of the (012) plane when the surface of the membrane is measured by X-ray diffractometry. Such distinctive peak characteristics indicate that the LDH plate-like particles constituting the membrane are oriented in the direction approximately perpendicular to the membrane (i.e., the perpendicular direction or an oblique direction comparable thereto, preferably the perpendicular direction). That is, the peak of the (003) plane is known as the most intense peak observed in an unoriented LDH powder subjected to X-ray diffraction, but with the LDH oriented membrane of the present invention, the peak of the (003) plane is not substantially detected or is detected to be smaller than the peak of the (012) plane due to the orientation of the LDH plate-like particles in the direction approximately perpendicular to the membrane. This is because of the following reason: since the (001) planes (I is 3 and 6) in the c-axis direction to which the (003) plane belongs are parallel to the layer structure of the LDH plate-like particles, when the LDH plate-like particles are oriented in the direction approximately perpendicular to the membrane, the LDH layer structure also faces the approximately perpendicular direction, and, as a result, the peaks of the (001) planes (I is 3 and 6) do not appear or are unlikely to appear when the membrane surface is measured by X-ray diffractometry. In particular, the peak of the (003) plane, if present, tends to appear more intense than the peak of the (006) plane, and thus it can be said that it is easier to verify the existence of the orientation in the approximately perpendicular direction according to the peak of the (003) plane than the peak of the (006) plane. Accordingly, it can be said that it is preferable for the LDH oriented membrane that no peak of the (003) plane is substantially detected because this suggests a high level of orientation in the perpendicular direction. In this regard, an intense peak of the (003) plane is detected from the LDH oriented membranes disclosed in Patent Documents 1 and 2 as well as Non-Patent Document 1, and the LDH oriented membranes are considered inferior in orientation in the approximately perpendicular direction and, moreover, do not seem to have a high denseness.

Figure 10:
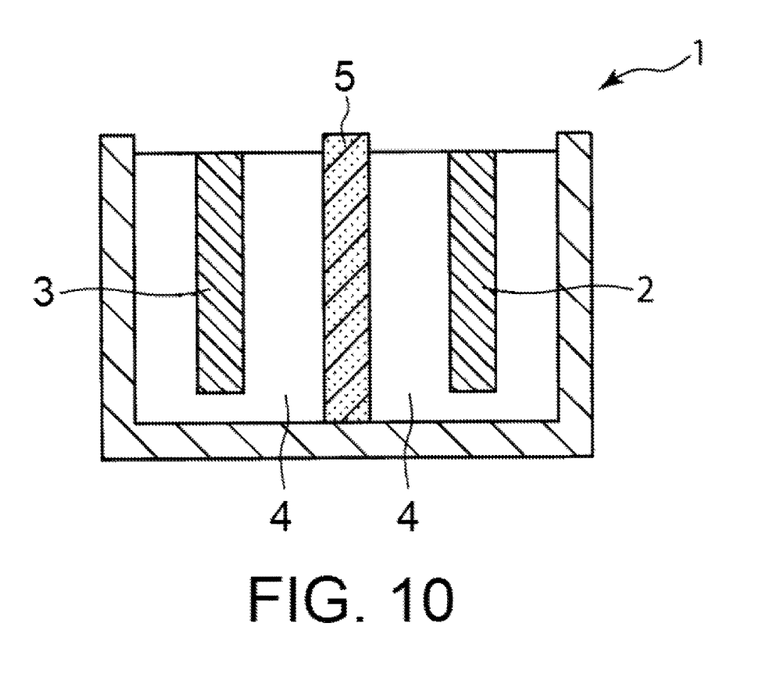
FIG. 10 is a conceptual drawing of the battery of the present invention.

On the other hand, as described above, the LDH oriented membrane of the present invention is a membrane in which LDH plate-like particles are highly oriented in the approximately perpendicular direction and which is also suitable for densification. This high level of orientation in the approximately perpendicular direction is a characteristic extremely advantageous to the LDH oriented membrane. This is because an LDH oriented body has anisotropic conductivity, in which the hydroxide ion conductivity in the direction of orientation of the LDH plate-like particles (i.e., the direction parallel to the layers of an LDH) is markedly higher than the conductivity in the direction perpendicular thereto. In fact, the inventors have found that in an oriented bulk body of an LDH, the conductivity (S/cm) in the orientation direction is one order of magnitude greater than the conductivity (S/cm) in the direction perpendicular to the orientation direction. That is, with the high level of orientation in the approximately perpendicular direction in the LDH oriented membrane of the present invention, anisotropic conductivity that an LDH oriented body can have is extracted to the maximum extent in the direction perpendicular to the membrane, and, as a result, the conductivity in the direction perpendicular to the membrane can be enhanced to the maximum extent. In addition, the LDH oriented membrane has a membrane form and therefore can achieve a lower resistance than LDHs in a bulk form. The LDH oriented membrane having such a high level of perpendicular orientation makes hydroxide ions more likely to be conducted in the perpendicular direction. In addition, since densification is also easily achieved, the LDH oriented membrane is extremely suitable for application to a functional membrane such as a battery separator (e.g., a hydroxide ion conductive separator for a zinc-air battery) for which a high conductivity in the direction perpendicular to the membrane and denseness are desired. Therefore, according to a preferable embodiment of the present invention, there is provided a battery comprising the layered double hydroxide oriented membrane of the present invention as a separator. FIG. 10 is a conceptual drawing of the battery 1 of the present invention, which comprises a positive electrode 2, a negative electrode 3, an electrolytic solution 4, and a layered double hydroxide oriented membrane separator 5 that is in contact with the electrolytic solution and separates the positive electrode and the negative electrode. Batteries of this embodiment are preferably secondary batteries, and secondary batteries can be various secondary batteries to which a hydroxide ion conductive ceramic separator can be applied, such as nickel-zinc secondary batteries, silver oxide-zinc secondary batteries, manganese oxide-zinc secondary batteries, zinc-air secondary batteries, and other various alkaline zinc secondary batteries, as well as lithium-air secondary batteries. In particular, nickel-zinc secondary batteries and zinc-air secondary batteries are preferable.

In the general formula above, $M^{2+}$ may be any divalent cation, and preferable examples include $Mg^{2+}$, $Ca^{2+}$, and $Zn^{2+}$, with $Mg^{2+}$ being more preferable. $M^{3+}$ may be any trivalent cation, and preferable examples include $Al^{3+}$ and $Cr^{3+}$, with $Al^{3+}$ being more preferable. $A^{n-}$ may be any anion, and preferable examples include $OH^-$ and $CO_3^{2-}$. Accordingly, it is preferable that in the general formula above, at least $M^{2+}$ comprises $Mg^{2+}$, $M^{3+}$ comprises $Al^{3+}$, and $A^{n-}$ comprises OH and/or $CO_3^{2-}$. The value of n is an integer of 1 or greater and is preferably 1 or 2. The value of x is 0.1 to 0.4 and is preferably 0.2 to 0.35. The value of m is 0 or greater and is typically a real number or integer that exceeds 0 or is no less than 1.

The LDH oriented membrane of the present invention is also suitable for densification, and the surface of the oriented membrane preferably has a porosity of 20% or less, more preferably 15% or less, even more preferably 10% or less, and particularly preferably 7% or less. A lower porosity of the surface of the oriented membrane means a higher denseness of the LDH oriented membrane, and it can be said that a lower porosity is more preferred. An LDH oriented membrane with a high denseness is useful for application to a functional membrane such as a battery separator (e.g., a hydroxide ion conductive separator for a zinc-air battery) as a hydroxide ion conductor. Here, the reason why the porosity of the surface of the oriented membrane is employed is because it is easy to measure porosity using image processing, which will be described below, and because it can be said that the porosity of the surface of the oriented membrane mostly represents the porosity in the interior of the oriented membrane. That is, it can be said that when the surface of the oriented membrane is dense, the interior of the oriented membrane is similarly dense. In the present invention, the porosity of the membrane surface can be measured in the following manner by a technique including image processing. That is, 1) obtain an electron microscopic (SEM) image (10000-fold or greater magnification) of the membrane surface, 2) load a grayscale SEM image using image analysis software such as Photoshop (manufactured by Adobe), 3) form a black-and-white binary image through [Image]→[Adjustments]→[Threshold], and 4) divide the number of pixels occupied by the black portions by the total number of pixels of the image to find porosity (%). It is preferable that this porosity measurement by image processing is performed on a 6 μm×6 μm area of the surface of the oriented membrane, and in order to provide a more objective reference, it is more preferable to employ the average of porosities obtained from randomly selected three areas.

The LDH oriented membrane of the present invention preferably has a thickness of 5 μm or less, more preferably 4 μm or less, and even more preferably 3 μm or less. Such a thickness makes it possible to achieve a desired low resistance suitable for practical use in battery applications or the like. The lower limit of the thickness of the LDH oriented membrane depends on the application and is therefore not particularly limited. In order to ensure certain hardness desired for a functional membrane such as a separator, the thickness is preferably 1 μm or greater and more preferably 2 μm or greater.

The LDH oriented membrane of the present invention is typically formed on a polymer substrate due to the production method, which will be described below. Although the details of the polymer substrate will be described below, it is preferable that the polymer substrate is porous to make the LDH oriented membrane usable as a functional membrane. For example, the LDH oriented membrane may be formed on a non-porous polymer substrate and then the polymer substrate may be made porous by any of known various techniques, or the LDH oriented membrane may be formed on a porous polymer substrate.

Method for Producing Layered Double Hydroxide Oriented Membrane

The layered double hydroxide oriented membrane (LDH oriented membrane) can be produced by (1) providing a polymer substrate of which a surface is anionized, (2) immersing the polymer substrate in an aqueous raw material solution comprising magnesium ions and aluminum ions in a total concentration of 0.20 to 0.40 mol/L and comprising urea, and (3) subjecting the polymer substrate to a hydrothermal treatment in the aqueous raw material solution to form the LDH oriented membrane on the polymer substrate.

(1) Provision of Surface-Anionized Polymer Substrate

In the method of the present invention, a surface-anionized polymer substrate is provided as a substrate. Due to the anionized surface, it is possible to generate an LDH nucleus on an anion-derived group in the subsequent step to promote the growth, and orientation in the approximately perpendicular direction, of LDH plate-like particles.

The surface-anionized polymer substrate may be provided by subjecting an anionizable polymer substrate to an anionization treatment by a known technique. The anionization treatment is preferably performed by imparting at least one selected from $SO_3^-$ (sulfonation), OH (hydroxylation), and $CO_2^-$ (carboxylation) that can serve as anions of the LDH to the surface of the polymer substrate, and the anionization treatment is more preferably sulfonation. It is desirable that the anionizable polymer substrate has alkali resistance as resistance against the electrolytic solution of a battery. The anionizable polymer substrate is preferably composed of at least one selected from the group consisting of polystyrene, polyethersulfone, polypropylene, epoxy resin, and polyphenylene sulfide, and such polymer substrates are particularly suitable for sulfonation. In particular, an aromatic polymer substrate is preferable for being easily anionized (in particular, sulfonated), and such an aromatic polymer substrate is composed of at least one selected from the group consisting of, for example, polystyrene, polyethersulfone, epoxy resin, and polyphenylene sulfide, and is most preferably composed of polystyrene. In the case of performing a sulfonation treatment, a polymer substrate capable of being sulfonated may be immersed in an acid capable of sulfonating, such as sulfuric acid (e.g., concentrated sulfuric acid), fuming sulfuric acid, chlorosulfonic acid, or sulfuric anhydride. Another sulfonating technique may be used as well. Immersion in an acid capable of sulfonating may be performed at room temperature or elevated temperature (e.g., 50 to 150° C.).

In the case of using an aromatic polymer substrate, when the surface of the sulfonated aromatic polymer substrate is analyzed by the attenuated total reflection (ATR) technique of Fourier transform infrared spectroscopy (FT-IR), the value $T_{1601}/T_{1127}$ obtained by dividing $T_{1601}$, which is the value of transmittance at 1601 $cm^{-1}$ derived from phenyl group CC stretching vibration, by $T_{1127}$, which is the value of transmittance at 1127 $cm^{-1}$ derived from a sulfonic acid group, of a transmission spectrum is preferably 0.920 or greater, more preferably 0.930 or greater, and even more preferably 0.940 or greater. In the transmission spectrum, the transmittance value $T_{1601}$ of the absorption peak observed at 1601 $cm^{-1}$ is the same irrespective of the presence or absence of the sulfonic group because the peak is derived from phenyl group CC stretching vibration. On the other hand, a higher sulfonic acid density leads to a lower transmittance value $T_{1127}$ of the absorption peak observed at 1127 $cm^{-1}$ because the peak is derived from the sulfonic acid group. Accordingly, the greater the $T_{1601}/T_{1127}$ value is, the more densely a large number of sulfonic acid groups can exist on the surface of the polymer substrate to densely form LDH nuclei which incorporate sulfonic acid groups as intermediate layer anions, thus contributing to the densification of the LDH oriented membrane. In consequence, when the polymer substrate is sulfonated, suitably adjusting the time of immersion in an acid capable of sulfonating makes it possible to set the $T_{1601}/T_{1127}$ value within the above range. For example, when performing a sulfonation treatment using concentrated sulfuric acid, the immersion time is preferably 6 days or longer, and more preferably 12 days or longer.

It is preferable that the polymer substrate anionized in this way is washed with ion exchanged water and then dried at room temperature or elevated temperature (e.g., 30 to 50° C.).

(2) Immersion in Aqueous Raw Material Solution

Next, the polymer substrate is immersed in an aqueous raw material solution preferably in a horizontal manner. It is preferable that the polymer substrate is horizontally suspended or floated in the aqueous raw material solution to cause an LDH to grow in the approximately perpendicular direction on the bottom surface side of the polymer substrate. The aqueous raw material solution comprises magnesium ions ($Mg^{2+}$) and aluminum ions ($Al^{3+}$) in a predetermined total concentration and comprises urea. Due to the presence of urea, ammonia is generated in the solution through the hydrolysis of urea, the pH value thus increases, the coexisting metal ions form hydroxides, and thereby an LDH can be obtained. Moreover, since the hydrolysis is accompanied by carbon dioxide generation, an LDH in which the anion is a carbonate ion can be obtained. The total concentration of magnesium ions and aluminum ions ($Mg^{2+}+Al^{3+}$) contained in the aqueous raw material solution is preferably 0.20 to 0.40 mol/L, more preferably 0.22 to 0.30 mol/L, and even more preferably 0.24 to 0.28 mol/L. A concentration within such a range enables nucleation and crystal growth to proceed in a well-balanced manner, and it is thus possible to obtain an LDH oriented membrane having not only excellent orientation but also excellent denseness. That is, it is considered that when the total concentration of magnesium ions and aluminum ions is low, crystal growth is more dominant than nucleation, and the number of particles is reduced, resulting in an increased particle size, and on the other hand, when this total concentration is high, nucleation is more dominant than crystal growth, and the number of particles is increased, resulting in a reduced particle size.

Preferably, magnesium nitrate and aluminum nitrate are dissolved in the aqueous raw material solution, and accordingly the aqueous raw material solution comprises nitrate ions in addition to magnesium ions and aluminum ions. In this case, the molar ratio (urea/$NO_3^-$) of urea to nitrate ions ($NO_3^-$) in the aqueous raw material solution is preferably 2 to 6 and more preferably 4 to 5.

(3) Formation of LDH Oriented Membrane by Hydrothermal Treatment

The polymer substrate is subjected to a hydrothermal treatment in the aqueous raw material solution to form an LDH oriented membrane on the polymer substrate. This hydrothermal treatment is preferably performed in a closed vessel at a temperature of 60 to 150° C., more preferably 65 to 120° C., even more preferably 65 to 100° C., and particularly preferably 70 to 90° C. The upper limit temperature of the hydrothermal treatment may be selected such that the polymer substrate does not thermally deform. The rate of temperature increase during the hydrothermal treatment is not particularly limited and may be, for example, 10 to 200° C./h, preferably 100 to 200° C./h and more preferably 100 to 150° C./h. The time of the hydrothermal treatment may be suitably determined according to the intended density and thickness of the LDH oriented membrane.

It is preferable to dry the resulting LDH oriented membrane. This drying may be performed, for example, at a temperature of 60 to 80° C. for 5 to 20 hours.

In the LDH oriented membrane produced as described above, LDH plate-like particles are highly oriented in the substantially perpendicular direction, which is advantageous for conductivity, and the LDH oriented membrane is also suitable for densification. In particular, when the dense LDH oriented membrane having sufficient gastight characteristics is used for a battery such as a zinc-air battery, improved power generation performance can be expected, and also a new application is expected to, for example, a separator for preventing zinc dentrite growth and carbon dioxide incorporation, which have been large technical barriers against making a secondary zinc-air battery in which an electrolytic solution is used and to which LDH membranes are not previously applicable.

EXAMPLES

The present invention will now be more specifically described by way of the following examples.

Example 1: Production of Layered Double Hydroxide Oriented Membrane (1) Sulfonation Treatment of Substrate A polystyrene plate having a size of 26.5 mm×30.0 mm×1.85 mm was provided as an aromatic polymer substrate, the surface of which was capable of being sulfonated. The surface of this polystyrene plate was wiped with ethanol for washing. This polystyrene plate was immersed in commercially available concentrated sulfuric acid (manufactured by Kanto Chemical Co., Inc., concentration: 95.0 mass % or higher) in a closed vessel at room temperature. After a lapse of the immersion time shown in Table 1, the polystyrene plate was removed from the concentrated sulfuric acid and washed with ion exchanged water. The washed polystyrene plate was dried at 40° C. for 6 hours, and thus a surface-sulfonated polystyrene plate was obtained to be used as a substrate for preparing Samples 1 to 17. Moreover, a polystyrene plate on which the above sulfonation treatment was not performed was also provided as a substrate for preparing Sample 18 of a comparative embodiment.

Figure 2:
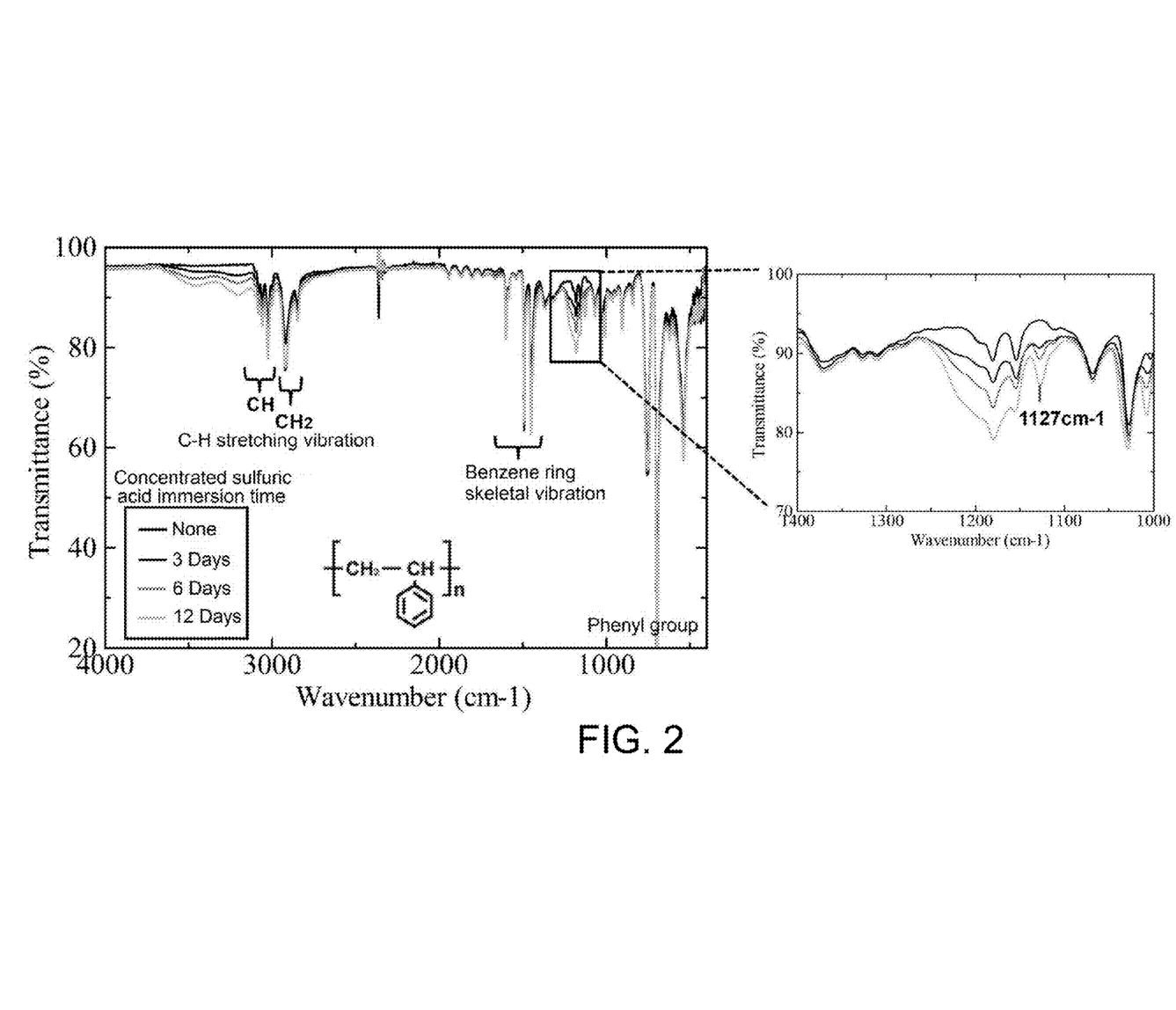
FIG. 2 shows transmission spectra of a polystyrene plate that has been sulfonation-treated for various immersion times in concentrated sulfuric acid, measured by the ATR technique of FT-IR in Example 1.

The transmission spectrum of the polystyrene plate was obtained by the attenuated total reflection (ATR) technique of Fourier transform infrared spectroscopy (FT-IR) before and after the sulfonation treatment to detect the peak derived from the sulfonic acid group. This analysis was performed using a horizontal ATR unit in an FT-IR apparatus to obtain a transmission spectrum under conditions in which the cumulative number of scans on the sample and the background was 64 each and the measurement range was 4000 to 400 $cm^{-1}$. FIG. 2 shows the transmission spectra of the polystyrene plate that was sulfonation-treated for various concentrated sulfuric acid immersion times. As shown in FIG. 2, from the polystyrene plate on which sulfonation treatment was performed, a peak derived from the sulfonic acid group was confirmed at a wave number of 1127 $cm^{-1}$, which does not appear from the plate on which sulfonation treatment was not performed, and it can be understood that the longer the concentrated sulfuric acid immersion time is, the higher the peak is. Given the fact that the measurement area is the same in each measurement, it is considered that the longer the concentrated sulfuric acid immersion time is, the larger the amount (density) of sulfonic acid group is.

From the transmission spectra obtained by the ATR technique, the ratio ($T_{1601}/T_{1127}$) of the transmittance peak value ($T_{1601}$) at 1601 cm$^{-1}$ derived from phenyl group CC stretching (benzene ring skeleton) vibration, which does not change before and after the sulfonation treatment, to the transmittance peak value ($T_{1127}$) at 1127 cm$^{-1}$ derived from the sulfonic acid group was calculated. Results are as shown in Table 1, suggesting that the longer the concentrated sulfuric acid immersion time is, the higher the proportion of sulfonic acid group is.

TABLE 1

| Concentrated sulfuric acid immersion time (days) | Transmittance peak value $T_{1601}$ at 1601 cm$^{-1}$ derived from phenyl group CC stretching vibration (%) | Transmittance peak value $T_{1127}$ at 1127 cm$^{-1}$ derived from sulfonic acid group (%) | Ratio of peak values $T_{1601}/T_{1127}$ |
|---|---|---|---|
| 0 | 81.585 | 94.206 | 0.866 |
| 3 | 80.154 | 89.660 | 0.894 |
| 6 | 81.439 | 88.457 | 0.921 |
| 12 | 79.844 | 84.845 | 0.941 |

(2) Production of Aqueous Raw Material Solution

Magnesium nitrate hexahydrate (Mg(NO$_3$)$_2$.6H$_2$O, manufactured by Kanto Chemical Co., Inc.), aluminum nitrate nonahydrate (Al(NO$_3$)$_3$.9H$_2$O, manufactured by Kanto Chemical Co., Inc.), and urea ((NH$_2$)$_2$CO, manufactured by Sigma-Aldrich Co.) were provided as raw materials. Magnesium nitrate hexahydrate and aluminum nitrate nonahydrate were weighed and placed in a beaker such that the cation ratio (Mg$^{2+}$/Al$^{3+}$) and the total metal ion molar concentration (Mg$^{2+}$+Al$^{3+}$) were as shown in Table 2, and ion exchanged water was added thereto to a total amount of 75 ml. After the resulting solution was stirred, urea that had been weighed to have a proportion shown in Table 2 was added to the solution, and stirring was further performed to give an aqueous raw material solution.

(3) Membrane Formation by Hydrothermal Treatment

The aqueous raw material solution produced in (2) above and the sulfonated substrate provided in (1) above were both charged into a closed Teflon (registered trademark) vessel (inner volume of 100 ml, furnished with a stainless-steel jacket on its outside). At this time, the substrate was in a state of being horizontally floated in the solution by itself. Thereafter, a layered double hydroxide oriented membrane was formed on the substrate surface by performing a hydrothermal treatment under conditions with the hydrothermal temperature, the hydrothermal time, and the rate of temperature increase as shown in Table 2. After a lapse of a predetermined time, the substrate was removed from the closed vessel, washed with ion exchanged water, and dried at 70° C. for 10 hours. In this way, layered double hydroxides (hereinafter referred to as LDHs) were obtained as Samples 1 to 18 on substrates. Samples 1 to 17 were in a membrane form, each having a thickness of about 2 μm. On the other hand, it was not possible to form a membrane of Sample 18.

Example 2: Evaluation of Orientation

The crystal phases of the samples of Samples 1 to 18 were measured with an X-ray diffractometer (D8 ADVANCE, manufactured by Bulker AXS) under measurement conditions of a voltage: 40 kV, a current value: 40 mA, and a measurement range: 5 to 70°. The resulting XRD profiles were identified using the diffraction peak of a layered double hydroxide (hydrotalcite compound) as provided in JCPDS Card No. 35-0964. As a result, it was confirmed that Samples 1 to 17 were all layered double hydroxides (hydrotalcite compounds).

Figure 3:
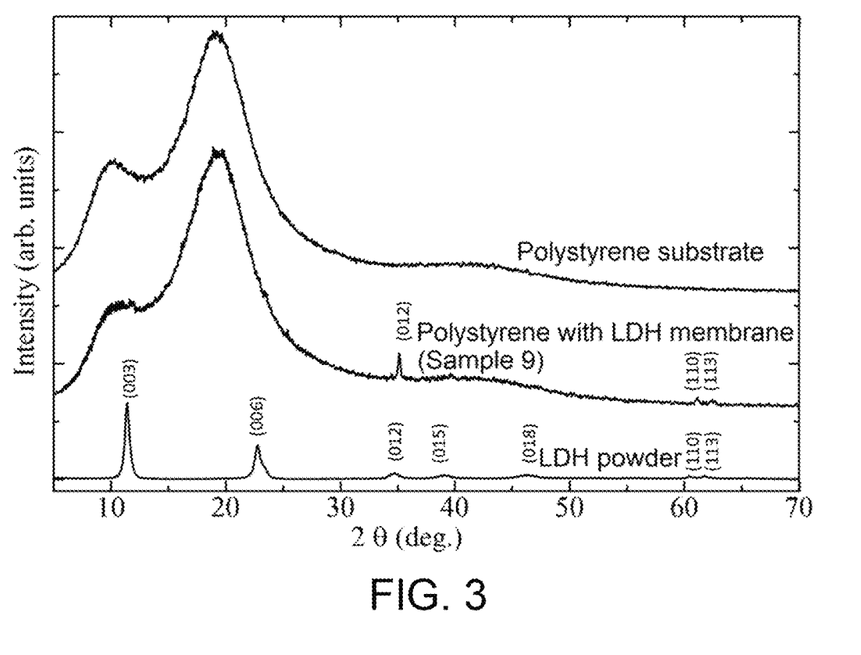
FIG. 3 is a diagram showing an XRD profile obtained with respect to the crystal phase of Sample 9 in Example 2.

Next, based on the resulting XRD profiles, the extent of crystal orientation in the LDH membranes were evaluated. For convenience of description, the XRD profile obtained with respect to the crystal phase of Sample 9 from which the highest membrane density was obtained is shown in FIG. 3. The profile shown at the top in FIG. 3 corresponds to the crystal phase of the polystyrene substrate, the profile shown in the middle corresponds to the crystal phase of the polystyrene substrate furnished with the LDH membrane, and the profile shown at the bottom corresponds to the crystal phase of the LDH powder. With the LDH powder, the peak of the (003) plane is the highest, but with the LDH oriented membrane, the peaks of the (001) planes (I is 3 and 6) are lowered, and peaks of the (012) plane, (110) plane and the like were observed. Thus, becoming unable to detect the peaks of the (001) planes suggested that the plate-like particles were oriented in the direction approximately perpendicular to the substrate (i.e., the perpendicular direction or an oblique direction comparable thereto).

The crystal orientations of other Samples 1 to 8 and 10 to 18 were also evaluated in the same manner as Sample 9 according to the following three-stage criteria. Results were as shown in Table 2.

<Evaluation Criteria of Crystal Orientation>

A: No peak of the (003) plane is detected, or the peak of the (003) plane is less than ½ the peak of the (012) plane in intensity B: The peak of the (003) plane is no less than ½ and no greater than the peak of the (012) plane in intensity.

Figure 4:
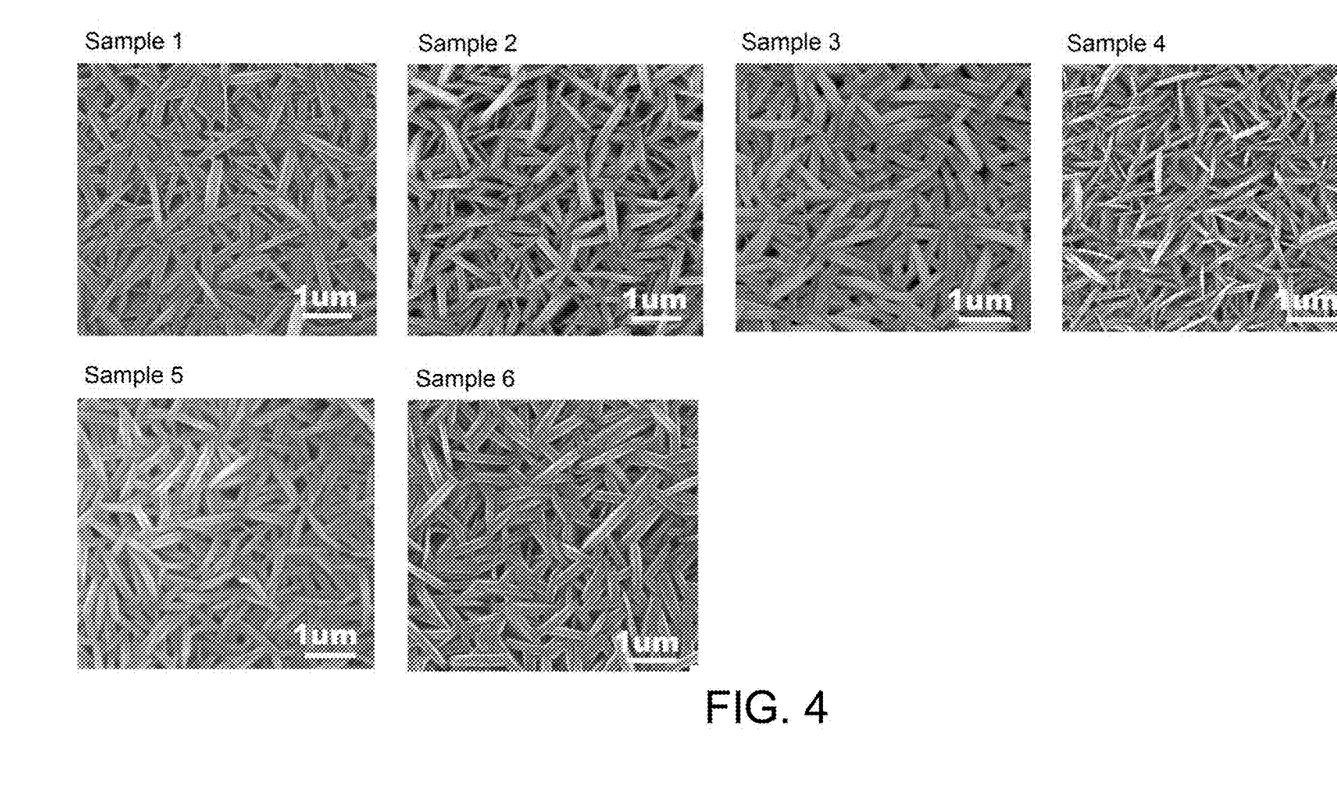
FIG. 4 shows SEM images depicting the surface microstructures of Samples 1 to 6 observed in Example 3.
Figure 5:
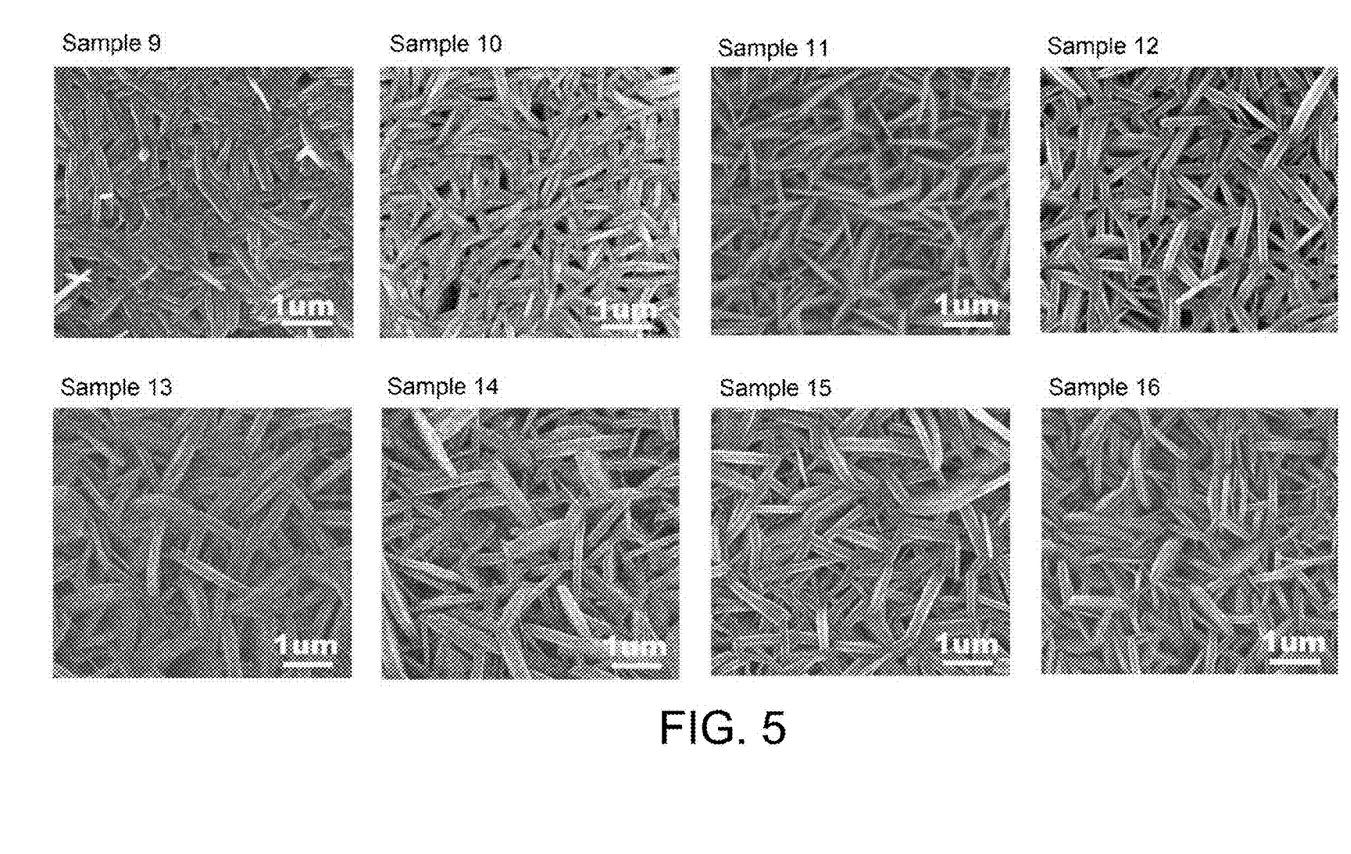
FIG. 5 shows SEM images depicting the surface microstructures of Samples 9 to 16 observed in Example 3.
Figure 6:
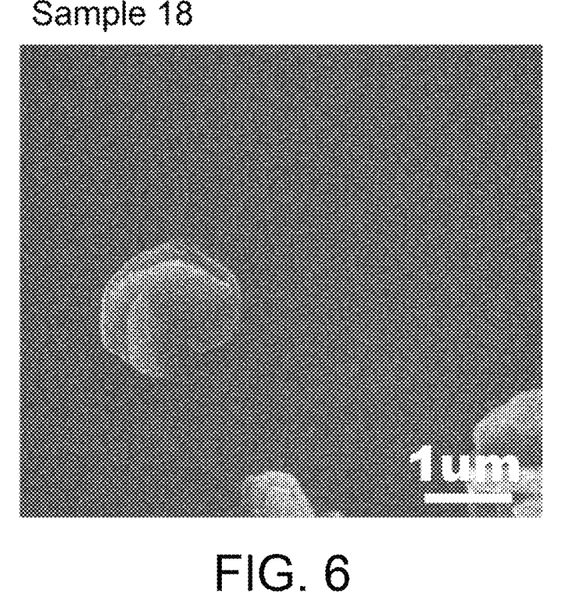
FIG. 6 is an SEM image depicting the surface microstructure of comparative Sample 18 observed in Example 3.

C: The peak of the (003) plane is greater than the peak of the (012) plane in intensity Example 3: Observation of Microstructure The surface microstructures of Samples 1 to 6, 9 to 16, and 18 were observed using a scanning electron microscope (SEM, JSM-6610LV, manufactured by JEOL) at an accelerating voltage of 10 to 20 kV. The resulting SEM images (secondary electron images) of the surface microstructures of Samples 1 to 6, 9 to 16, and 18 are shown in FIGS. 4 to 6. According to the images shown in these figures, the sample with smallest voids (i.e., with the highest density) was Sample 9. Comparative Sample 18 did not have a membrane form.

Figure 7:
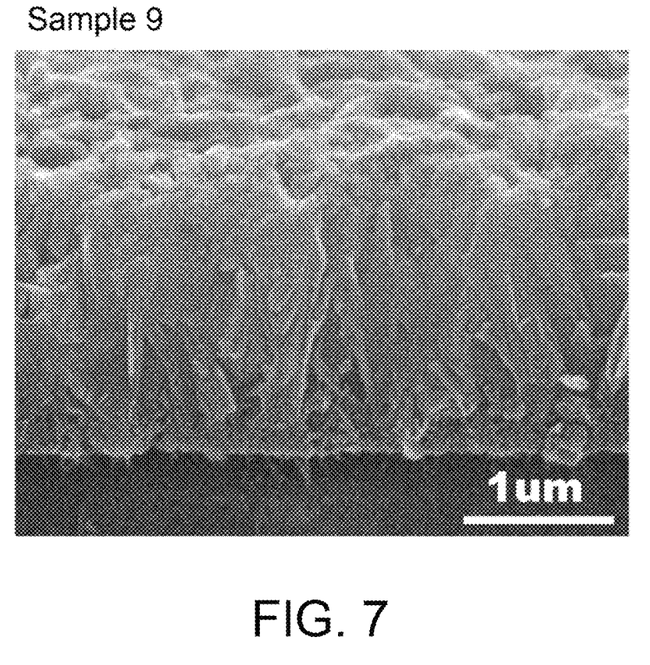
FIG. 7 is an SEM image of the microstructure of the fractured cross-section of Sample 9 observed in Example 3.

The cross-sectional microstructure of Sample 9 was observed in the following manner. First, the microstructure of the cross-section that had been fractured (hereinafter referred to as a fractured cross-section) of Sample 9 was observed using a scanning electron microscope (SEM, JSM-6610LV, manufactured by JEOL) at an accelerating voltage of 10 to 20 kV. FIG. 7 shows the SEM image of the microstructure of the fractured cross-section of Sample 9 obtained in this way.

Figure 8:
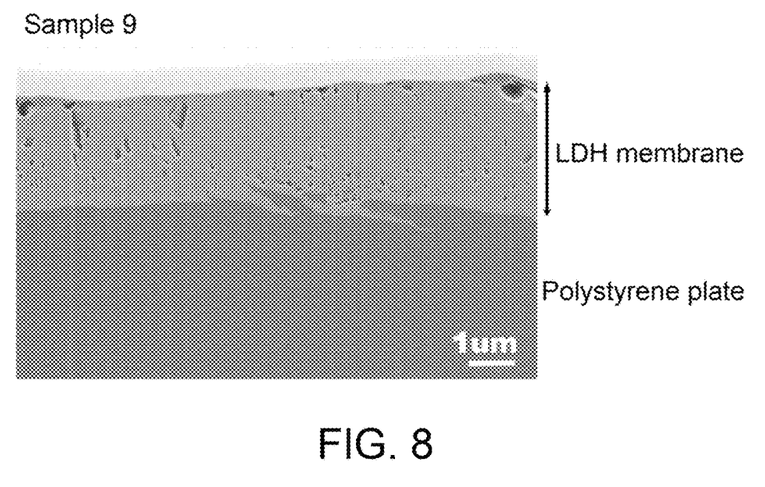
FIG. 8 is an SEM image of the microstructure of the polished cross-section of Sample 9 observed in Example 3.
Figure 9:
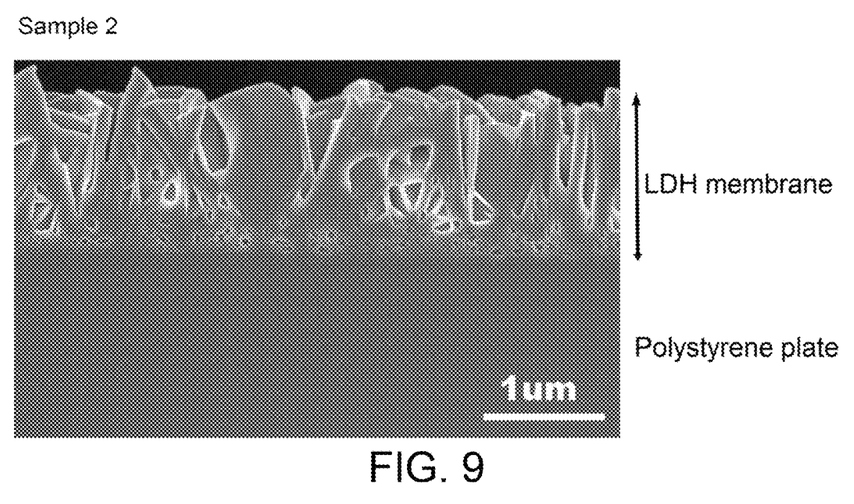
FIG. 9 is an SEM image of the microstructure of the polished cross-section of Sample 2 observed in Example 3.

Next, the fractured cross-section of Sample 9 was polished by FIB polishing and cryomilling to form a polished cross-section, and the microstructure of this polished cross-section was observed using a field emission scanning electron microscope (FE-SEM) at an accelerating voltage of 1.5 kV to 3 kV. FIG. 8 shows the SEM image of the microstructure of the polished cross-section of Sample 9 obtained in this way. Concerning Sample 2 as well, the microstructure of the polished cross-section was observed in the same manner as above, and the SEM image shown in FIG. 9 was thus obtained.

Example 4: Measurement of Porosity and Membrane Density

Concerning Samples 1 to 6, 9 to 16, and 18, the porosity of the membrane surface was measured by a technique including image processing. This porosity measurement was performed as follows: 1) obtain an electron microscopic (SEM) image (10000-fold or greater magnification) of the membrane surface according to the procedure set forth in Example 3, 2) load a gray-scale SEM image using image analysis software such as Photoshop (manufactured by Adobe), 3) form a black-and-white binary image through [Image]→[Adjustments]→[Threshold], and 4) divide the number of pixels occupied by black portions by the total number of pixels of the image to find porosity (%). This porosity measurement was performed on a 6 μm×6 μm area of the surface of the oriented membrane.

Using the resulting porosity of the membrane surface, the density D as determined from the membrane surface (hereinafter referred to as the surface membrane density) was calculated according to D=100%−(Porosity of membrane surface), and the results shown in Table 2 were obtained. Moreover, the denseness of the membrane was evaluated according to the following four-stage criteria based on the measured membrane density of the surface and was as shown in Table 2.

<Denseness Evaluation Criteria>
A: Surface membrane density is 90% or higher.
B: Surface membrane density is 80% or higher and lower than 90%.
C: Surface membrane density is 50% or higher and lower than 80%.
D: Surface membrane density is lower than 50%

Moreover, concerning Samples 2 and 9, the porosity of the polished cross-section was also measured. This measurement of the porosity of the polished cross-section as well was performed in the same manner as the porosity of the membrane surface described above except that an electron microscopic (SEM) image (10000-fold or greater magnification) of the cross-sectional polished surface in the thickness direction of the membrane was obtained according to the procedure set forth in Example 3. This porosity measurement was performed on a 2 μm×4 μm area of the cross-section of the oriented membrane. The porosity calculated from the cross-sectional polished surface of Sample 9 in this way was 4.8% on average (the average of porosities of two portions of the cross-sectional polished surface), and it was thus confirmed that a highly dense membrane was formed. Also, the porosity of the polished cross-section of Sample 2, which had a lower density than Sample 9, was calculated to be 22.9% on average (the average of porosities of two portions of the cross-sectional polished surface). As can be understood from the results shown in Table 2, the surface porosity and the cross-sectional porosity mostly correspond to each other. Accordingly, it can be understood that the above-described surface membrane density calculated based on the surface porosity and, moreover, the denseness of the membrane evaluated based thereon mostly reflect the properties of not only the membrane surface but also the entire membrane including the interior of the membrane in the thickness direction.

TABLE 2

| Sample No. | Sulfonation treatment condition — Concentrated sulfuric acid immersion time (day) | FTIR-ATR peak ratio $T_{1601}/T_{1127}$ | Solution mixing condition — Cation ratio ($Mg^{2+}/Al^{3+}$) | Proportion of urea (urea/$NO_3^-$) | Total metal ion molar concentration ($Mg^{2+} + Al^{3+}$) (mol/L) | Hydrothermal temperature (° C.) | Hydrothermal time (day) | Rate of temperature increase (° C./h) |
|---|---|---|---|---|---|---|---|---|
| 1 | 3 | 0.894 | 2 | 4 | 0.200 | 70 | 7 | 150 |
| 2 | 3 | 0.894 | 2 | 4 | 0.253 | 70 | 7 | 150 |
| 3 | 3 | 0.894 | 2 | 4 | 0.267 | 70 | 7 | 150 |
| 4 | 3 | 0.894 | 2 | 4 | 0.280 | 70 | 7 | 150 |
| 5 | 6 | 0.921 | 2 | 4 | 0.280 | 70 | 7 | 150 |
| 6 | 12 | 0.941 | 2 | 4 | 0.240 | 70 | 7 | 150 |
| 7 | 12 | 0.941 | 2 | 4 | 0.253 | 70 | 7 | 150 |
| 8 | 12 | 0.941 | 2 | 4 | 0.267 | 70 | 7 | 150 |
| 9 | 12 | 0.941 | 2 | 4 | 0.280 | 70 | 7 | 150 |
| 10 | 12 | 0.941 | 2 | 4 | 0.320 | 70 | 7 | 150 |
| 11 | 3 | 0.894 | 3 | 4 | 0.200 | 70 | 7 | 150 |
| 12 | 3 | 0.894 | 2 | 5 | 0.200 | 70 | 7 | 150 |
| 13 | 3 | 0.894 | 2 | 4 | 0.200 | 90 | 7 | 150 |
| 14 | 3 | 0.894 | 2 | 5 | 0.200 | 90 | 7 | 150 |
| 15 | 3 | 0.894 | 2 | 4 | 0.200 | 70 | 14 | 150 |
| 16 | 3 | 0.894 | 2 | 4 | 0.200 | 70 | 7 | 10 |
| 17 | 12 | 0.941 | 2 | 4 | 0.400 | 70 | 7 | 150 |
| 18* | None | 0.861 | 2 | 4 | 0.200 | 70 | 7 | 150 |

| Sample No. | Cross-section porosity (%) | Surface porosity (%) | Surface membrane density (%) | Denseness | Crystal orientation |
|---|---|---|---|---|---|
| 1 | — | 18.8 | 81.2 | B | A |
| 2 | 22.9 | 19.7 | 80.3 | B | A |
| 3 | — | 11.5 | 88.5 | B | A |
| 4 | — | 26.1 | 73.9 | C | B |
| 5 | — | 13.5 | 86.5 | B | A |
| 6 | — | 14.3 | 85.7 | B | A |
| 7 | — | — | — | — | A |
| 8 | — | — | — | — | A |

TABLE 2-continued

| | | | | | |
|---|---|---|---|---|---|
| 9 | 4.8 | 6.5 | 93.5 | A | A |
| 10 | — | 11.6 | 88.4 | B | A |
| 11 | — | 45.8 | 54.2 | C | B |
| 12 | — | 18.8 | 81.2 | B | A |
| 13 | — | 31.3 | 68.7 | C | B |
| 14 | — | 22.0 | 78.0 | C | B |
| 15 | — | 23.4 | 76.6 | C | A |
| 16 | — | 23.6 | 76.4 | C | B |
| 17 | — | — | — | — | B |
| 18* | — | 100.0 | 0.0 | D | — |

*indicates a comparative embodiment.

As shown in Table 2, mostly dense membranes having the desired crystal orientation were obtained in all Samples 1 to 17. In particular, in Samples 5 to 10 in which the amount (density) of sulfonic group was increased by extending the concentrated sulfuric acid immersion time under sulfonation treatment conditions, membranes having not only high crystal orientation but also excellent denseness were obtained. On the other hand, in Sample 18 in which a polystyrene substrate that was not sulfonated was used, a nucleus of an LDH was not generated, and an LDH membrane was not formed.

What is claimed is:

1. A battery including a separator comprising a layered double hydroxide oriented membrane composed of a layered double hydroxide represented by the following general formula:

$M^{2+}_{1-x}M^{3+}_{x}(OH)_2A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, x is 0.1 to 0.4, and m is 0 or greater,
wherein when a surface of the oriented membrane is measured by X-ray diffractometry, a peak of a (003) plane is detected to be smaller than a peak of a (012) plane,
wherein the layered double hydroxide oriented membrane is formed on a polymer substrate, and
wherein the layered double hydroxide oriented membrane has a thickness of 5 μm or less.

2. The battery according to claim 1, wherein in the general formula, at least $M^{2+}$ comprises $Mg^{2+}$, $M^{3+}$ comprises $Al^{3+}$, and $A^{n-}$ comprises $OH^-$ and/or $CO_3^{2-}$.

3. The battery according to claim 1, wherein the surface of the oriented membrane has a porosity of 20% or less.

4. The battery according to claim 1, wherein the surface of the oriented membrane has a porosity of 10% or less.

5. The battery according to claim 1, wherein the peak of the (003) plane is less than ½ the peak of the (012) plane in intensity.

6. A method for producing a layered double hydroxide oriented membrane, comprising the steps of:
providing a polymer substrate of which a surface is anionized;
immersing the polymer substrate in an aqueous raw material solution comprising magnesium ions ($Mg^{2+}$) and aluminum ions ($Al^{3+}$) in a total concentration of 0.20 mol/L to 0.40 mol/L and comprising urea; and
subjecting the polymer substrate to a hydrothermal treatment in the aqueous raw material solution to form the layered double hydroxide oriented membrane on the polymer substrate,
wherein the layered double hydroxide is represented by the following general formula:

$M^{2+}_{1-x}M^{3+}_{x}(OH)_2A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, x is 0.1 to 0.4, and m is 0 or greater,
wherein when the surface of the oriented membrane is measured by X-ray diffractometry, a peak of a (003) plane is detected to be smaller than a peak of a (012) plane, and
wherein the layered double hydroxide oriented membrane has a thickness of 5 μm or less.

7. The method according to claim 6, wherein the anionization is performed by imparting at least one selected from the group consisting of $SO_3^-$, $OH^-$, and $CO_2^-$ to the surface of the polymer substrate.

8. The method according to claim 6, wherein the polymer substrate of which the surface is anionized is a polymer substrate of which a surface is sulfonated.

9. The method according to claim 8, wherein the sulfonated polymer substrate is an aromatic polymer substrate, which is sulfonated such that when a surface of the aromatic polymer substrate is analyzed by an attenuated total reflection (ATR) technique of Fourier transform infrared spectroscopy (FT-IR), a value $T_{1601}/T_{1127}$ is 0.920 or greater wherein the value $T_{1601}/T_{1127}$ is obtained by dividing $T_{1601}$, which is a value of transmittance at 1601 cm$^{-1}$ derived from phenyl group CC stretching vibration, by $T_{1127}$, which is a value of transmittance at 1127 cm$^{-1}$ derived from a sulfonic acid group, of a transmission spectrum.

10. The method according to claim 8, wherein the step of providing a polymer substrate of which a surface is sulfonated is performed by providing a polymer substrate capable of being sulfonated, and immersing the polymer substrate in at least one selected from the group consisting of sulfuric acid, fuming sulfuric acid, chlorosulfonic acid, and sulfuric anhydride.

11. The method according to claim 6, wherein the total concentration of magnesium ions and aluminum ions is 0.24 mol/L to 0.28 mol/L.

12. The method according to claim 8, wherein the hydrothermal treatment is performed in a closed vessel at a temperature of 60° C. to 150° C.

13. The method according to claim 6, wherein magnesium nitrate and aluminum nitrate are dissolved in the aqueous raw material solution, whereby the aqueous raw material solution comprises nitrate ions in addition to magnesium ions and aluminum ions.

14. The method according to claim 13, wherein a molar ratio of the urea to the nitrate ions ($NO_3^-$) in the aqueous raw material solution is 4 to 5.

15. The method according to claim 6, wherein the polymer substrate is composed of at least one selected from the group consisting of polystyrene, polyethersulfone, epoxy resin, and polyphenylene sulfide.

* * * * *